United States Patent
Srivastava et al.

(10) Patent No.: US 11,107,209 B2
(45) Date of Patent: Aug. 31, 2021

(54) AUTOMATED INSPECTION USING ARTIFICIAL INTELLIGENCE

(71) Applicant: The Boeing Company, Chicago, IL (US)

(72) Inventors: Iti Srivastava, Summerville, SC (US); Raviendra Sidath Suriyaarachchi, Daniel Island, SC (US); Benjamin Rennison, Ladson, SC (US)

(73) Assignee: The Boeing Company, Chicago, IL (US)

( * ) Notice: Subject to any disclaimer, the term of this patent is extended or adjusted under 35 U.S.C. 154(b) by 119 days.

(21) Appl. No.: 16/383,516

(22) Filed: Apr. 12, 2019

(65) Prior Publication Data
US 2020/0327651 A1     Oct. 15, 2020

(51) Int. Cl.
*G06T 7/00*     (2017.01)
*G06T 17/00*     (2006.01)
*G06N 20/00*     (2019.01)

(52) U.S. Cl.
CPC ............ *G06T 7/001* (2013.01); *G06N 20/00* (2019.01); *G06T 17/00* (2013.01)

(58) Field of Classification Search
CPC .......... G06T 7/001; G06T 17/00; G06N 20/00
See application file for complete search history.

(56) References Cited

U.S. PATENT DOCUMENTS

| | | | | |
|---|---|---|---|---|
| 2009/0288047 | A1* | 11/2009 | Tang | G03F 1/36 |
| | | | | 716/136 |
| 2014/0277662 | A1* | 9/2014 | Kesler | G06Q 50/04 |
| | | | | 700/97 |
| 2019/0001589 | A1* | 1/2019 | Salimi | G06F 30/00 |

FOREIGN PATENT DOCUMENTS

WO    WO-2020034632 A1 *   2/2020

OTHER PUBLICATIONS

WO 2020034632-A1 eng.*

* cited by examiner

*Primary Examiner* — Zhitong Chen

(57) ABSTRACT

An electronic device includes at least one processor, at least one memory storing a model based definition (MBD) representing a model of a part, and an artificial intelligence (AI) client service. The AI client service, in response to execution by the at least one processor, is configured to receive inspection data corresponding to a cut part being fabricated based on the model of the part, compare the received inspection data to the MBD to determine any deviations of the cut part from the MBD, determine whether the cut part is defective based on the comparison, and update a digital thread corresponding to the part when the cut part is determined to be defective.

20 Claims, 8 Drawing Sheets

AUTOMATED INSPECTION USING ARTIFICIAL INTELLIGENCE

BACKGROUND

Composite structures are used in a wide variety of industries and for a wide variety of applications. For example, composite structures are widely used in the automotive industry and the aerospace industry, among others. Composite structures are often fabricated by arranging a layup of one or more plies of base material (e.g., fabric, etc.) on a layup table and cutting the layup to define one or more parts from the layup. After being cut, the parts are inspected to verify that each part is compliant with various design parameters (e.g., dimensions, angles, profiles, shapes, etc.). If a part passes the inspection as compliant, the part is either stored for future use or is further processed (e.g., impregnated, laminated, cured, folded, formed, molded, assembled, further inspected, etc.) to complete the finished composite structure.

Currently, known inspection processes for composite structures are semiautomated. In other words, known inspection processes for composite structures include both automated machine operations and manual operations performed by one or more human operators. For example, an electronic device automatically obtains inspection data (e.g., measures, images, etc.) using a robotic arm and/or other automated inspection device and a human operator manually compares the obtained inspection data with the design parameters. But, semiautomated inspection processes that involve manual operations performed by human operators are time consuming, costly, and/or less efficient. For example, if only some parts of a layup fail the inspection process, the failed parts are often remade using the same amount of material originally used to cut all of the parts of the layup, which is costly and less efficient. While the nesting program that controls the arrangement of the layup on the layup table can be revised to use only the amount of material necessary to recut the failed parts, such revisions to the nesting program are time consuming (e.g., often taking an entire day, etc.) and thereby reduce the efficiency and increase the cost of the fabrication of composite structures.

SUMMARY

In one aspect, an electronic device is provided. The electronic device includes at least one processor, at least one memory storing a model based definition (MBD) representing a model of a part, and an artificial intelligence (AI) client service. The AI client service, in response to execution by the at least one processor, is configured to receive inspection data corresponding to a cut part being fabricated based on the model of the part, compare the received inspection data to the MBD to determine any deviations of the cut part from the MBD, determine whether the cut part is defective based on the comparison, and update a digital thread corresponding to the part when the cut part is determined to be defective.

In another aspect, a computerized method is provided. The computerized method includes receiving a model based definition (MBD) representing a model of a part, receiving inspection data corresponding to a cut part being fabricated based on the model of the part, comparing the received inspection data to the MBD to determine any deviations of the cut part from the MBD, determining whether the cut part is defective based on the comparison, and updating a digital thread corresponding to the part when the cut part is determined to be defective.

In another aspect, one or more computer storage media having computer-executable instructions for leveraging artificial intelligence (AI) is provided that, in response to execution by a processor, cause the processor to at least receive a model based definition (MBD) representing a model of a part, receive inspection data corresponding to a cut part being fabricated based on the model of the part, compare the received inspection data to the MBD to determine any deviations of the cut part from the MBD, determine whether the cut part is defective based on the comparison, and update a digital thread corresponding to the part when the cut part is determined to be defective.

DETAILED DESCRIPTION

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" or "one implementation" are not intended to be interpreted as excluding the existence of additional embodiments or implementations that also incorporate the recited features. Moreover, unless explicitly stated to the contrary, embodiments "comprising" or "having" an element or a plurality of elements having a particular property can include additional elements not having that property.

Implementations of the systems, methods, and electronic devices described herein enable automated inspection using artificial intelligence (AI). Implementations of the automated inspection disclosed herein enable the automated generation of critical manufacturing as-fabricated data for automatic comparison to as-designed and/or specified process data, for example to enable automated root cause analysis when product specifications differ from predefined engineering specifications. In some implementations, the automated inspection disclosed herein reduces the amount of material used to cut a given number of parts, reduces the time required to cut a given number of parts, and/or increase the number of parts cut within a given time period, thereby increasing efficiency, reducing costs, etc. Moreover, implementations of the AI client disclosed herein track and analyze the occurrence of defective parts over time for one or more different parts to determine and take one or more actions that reduce, eliminate, mitigate, alleviate, and/or the like future occurrences of defective parts for one or more different parts. The implementations of the automated inspection disclosed herein thereby increase the efficiency and/or reduce the cost of fabricating one or more different parts.

Figure 1:
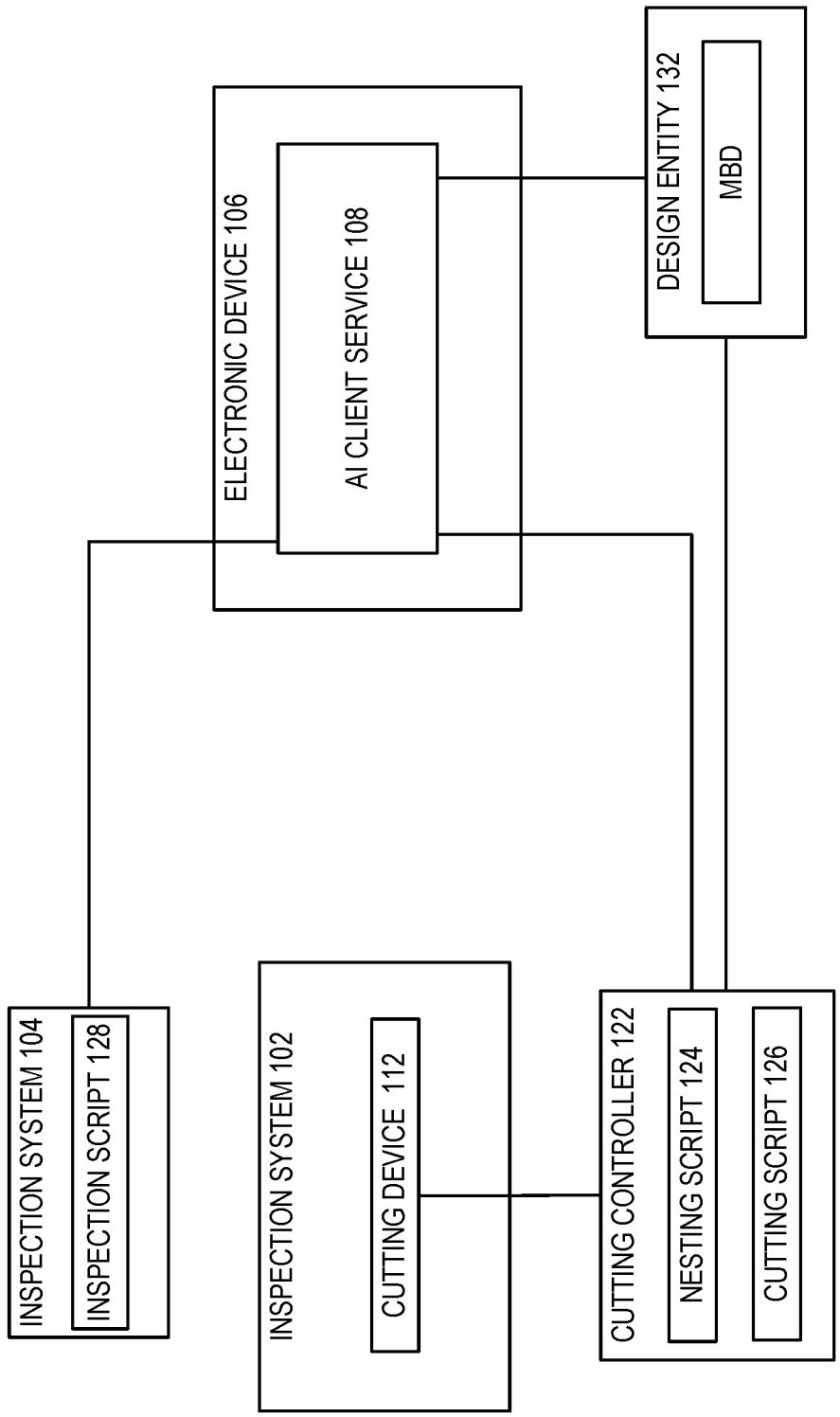
FIG. 1 is a block diagram of an implementation of an automated inspection system.

FIG. 1 is a block diagram of an automated cutting and inspection system 100 for cutting and inspecting one or more different parts. In the implementations described and illustrated herein, the parts cut and inspected by the system 100 are composite parts. In other implementations, the parts cut and inspected by the system 100 are one or more other types of parts, for example metallic parts, plastic parts, polymer parts, etc. Examples of composite parts cut and inspected by the system 100 include, but are not limited to, aircraft frame fillers, aircraft stringers, automotive body panels, automotive aerodynamic structures, and/or the like. Other types of composite parts are cut and inspected by the system 100 in other implementations.

The system 100 includes a layup table 102, an inspection system 104, and an electronic device 106, which includes an artificial intelligence (AI) client service 108. As will be described in more detail below, the AI client service 108 receives a model based definition (MBD) representing a model of a part and inspection data corresponding to a cut part that is being fabricated based on the model of the part. The AI client service 108 compares the received inspection data to the MBD to determine any deviations of the cut part from the MBD; and determines whether the cut part is defective based on the comparison. When the cut part is determined to be defective, the AI client service 108 updates a digital thread corresponding to the part. The digital thread will be described in more detail below.

The layup table 102 includes a layup surface 110 on which one or more plies of a base material is arranged to enable one or more parts to be cut therefrom. In some implementations, the layup surface 110 includes one or more forming tools (not shown) on which the base material is arranged. In some implementations, the base material is a fabric that is used to fabricate one or more composite parts. Any number of plies of the base material are arranged on the layup surface 110. In some implementations, a single ply of the base material is arranged on the layup surface 110. In other implementations, two or more plies of the base material are arranged (e.g., stacked, etc.) on the layup surface 110. The base material is sometimes referred to as a "charge". One or more plies of the base material arranged on the layup surface 110 will be referred to herein as a "layup".

The system 100 includes a cutting device 112 that cuts one or more predetermined shapes from the layup of base material. Each predetermined shape cut by the cutting device 112 is defined by a corresponding MBD that represents a model of the part being cut. For example, the MBD includes the profile(s), shape(s), and/or dimensions (e.g., the predefined engineering specifications, etc.) of the model of the part. In some implementations, the MBD of a part includes one or more tolerances of one or more dimensions of the predetermined shape defined by the MBD. The MBD includes fold lines, bend lines, forming lines, and/or the like in some implementations. Moreover, in some implementations, the MBD of a part includes a representation (e.g., a model, dimensions, etc.) of the layup surface 110 and/or a forming tool of the layup surface.

In some implementations, the predetermined shape defined by the MBD is a two-dimensional (2D) representation of a part that ultimately has a finished three-dimensional (3D) shape. In other words, the MBD represents the 2D size and shape that corresponds to the finished 3D shape of a part in some implementations (e.g., the unfolded size and shape of a 3D part, the size and shape of a single ply of a part having a 3D shape built from two or more plies, etc.). In other implementations, the predetermined shape defined by the MBD is a 3D representation of the corresponding part (e.g., a part overlaid on a 3D forming tool of the layup surface 110, etc.).

In the implementation shown in FIG. 1, the cutting device 112 is a component of the layup table 102. In other words, the cutting device 112 is integrated into the layup table 102. In other implementations, the cutting device 112 is not integrated into the layup table 102 but rather is a separate component of the system 100 that is configured (e.g., positioned, etc.) to cut layups of base material arranged on the layup surface 110 of the layup table 102. The cutting device 112 is any type of cutting device (e.g., an ultrasonic knife, a mechanical knife, etc.) that enables the cutting device 112 to cut the layup of base material according to the MBD(s). In some implementations, the cutting device 112 stores one or more MBDs.

Figure 2:
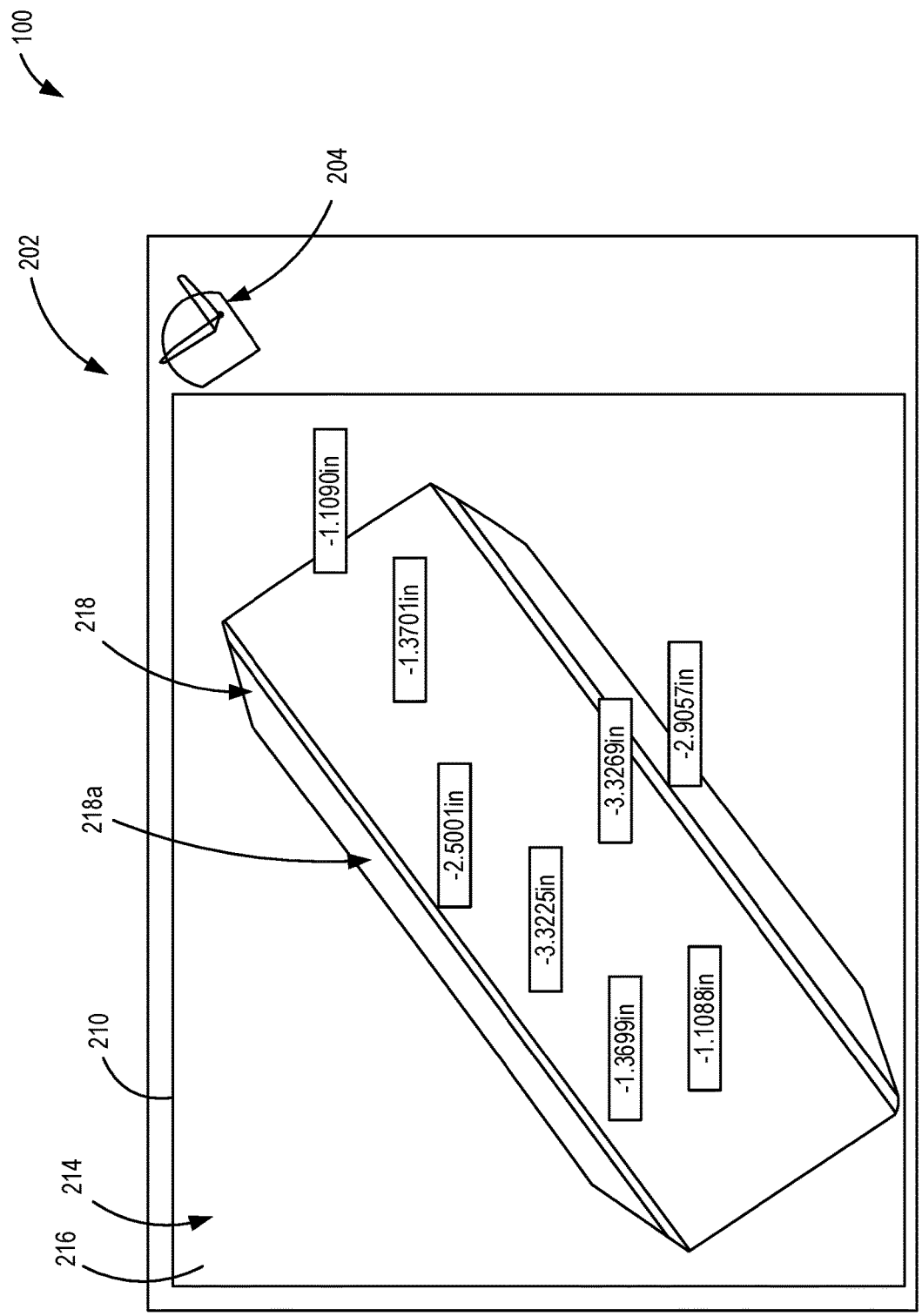
FIG. 2 is a plan view of an implementation of a trim table of the system shown in FIG. 1.

A single layup of the base material on the layup surface 110 is used to cut any number of different parts and any number of each different part. For example, FIG. 2 is a plan view of one implementation of a layup table 202 of the system 100. The layup table 202 includes a layup surface 210 on which a layup 214 of base material is arranged. In the implementation shown in FIG. 2, the layup 214 includes a single ply 216 of the base material. Moreover, the layup 214 is used to cut a single individual part 218a of a part 218 in the implementation shown in FIG. 2. Specifically, the cutting device 112 (shown in FIG. 1) of the system 100 has cut from the layup 214 a single predetermined shape that is defined by an MBD that represents a model of the part 218. In other implementations of the layup table 202 shown in FIG. 2, the layup 214 is used to cut two or more (i.e., any number) of the part 218.

Figure 3:
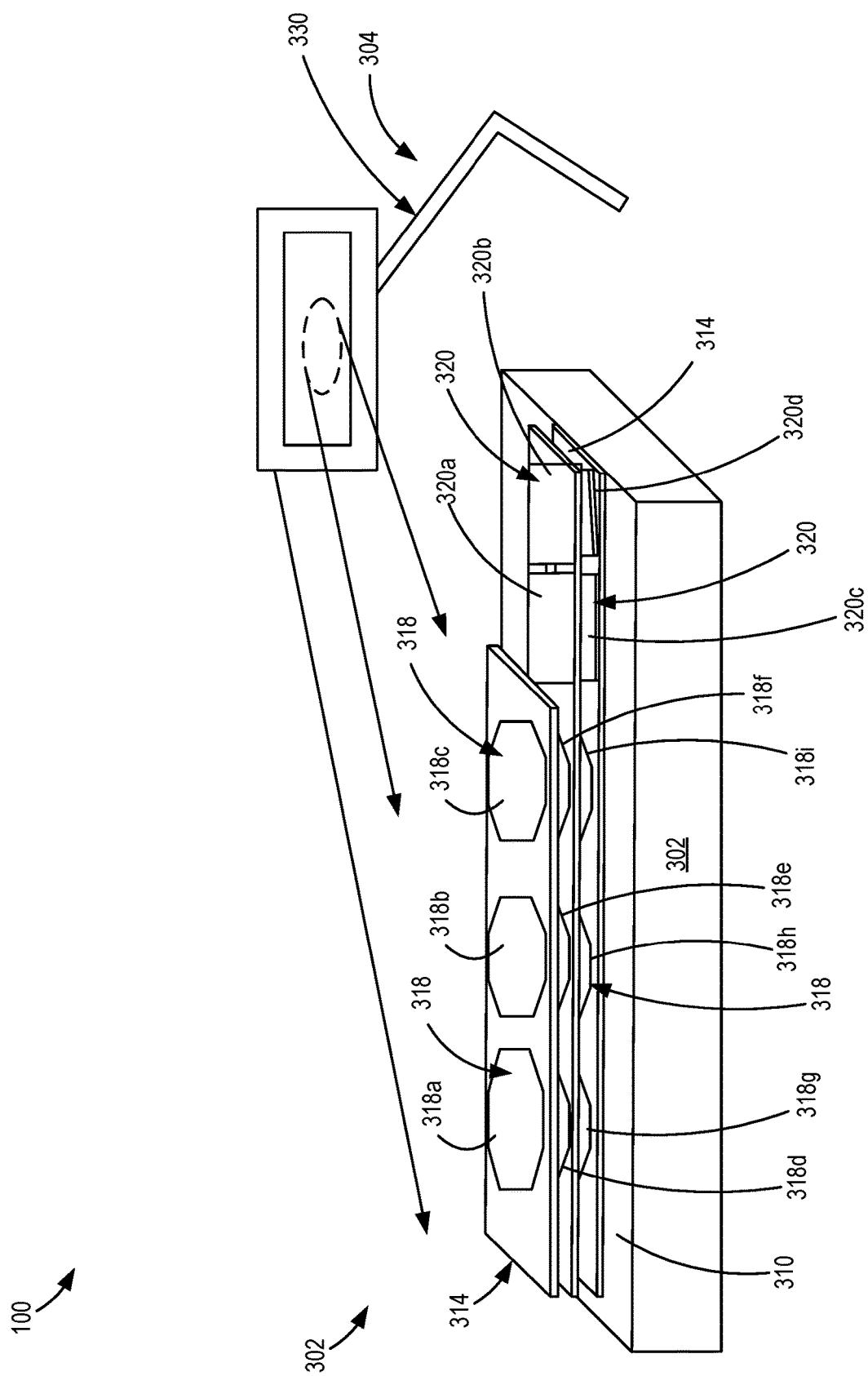
FIG. 3 is a perspective view of another implementation of a trim table of the system shown in FIG. 1.

FIG. 3 illustrates another example of a layup table 302 of the system 100. The layup table 302 includes a layup surface 310 on which a layup 314 of base material is arranged. In the implementation shown in FIG. 3, the layup 314 includes three plies 316a, 316b, and 316c of the base material. The plies 316a, 316b, and 316c of the layup 314 have been partially exploded in FIG. 3 for clarity. The layup 314 shown in FIG. 3 is used to cut two different parts 318 and 320. Specifically, the cutting device 112 (shown in FIG. 1) has cut nine individual parts 318a-i of the part 318 and four individual parts 320a-d of the part 320 from the layup 314. In other implementations of the layup table 302 shown in FIG. 3, the parts 318a, 318d, and 318g are different layers of one individual part 318, the parts 318b, 318e, and 318h are different layers of one individual part 318, the parts 318c, 318f, and 318i are different layers of one individual part 318, the parts 320a and 320c are different layers of one individual part 320, and/or the parts 320b and 320d are different layers of one individual part 320.

Referring again to FIG. 1, the system 100 includes a cutting controller 122 communicatively coupled to the cutting device 112 for controlling operation of the cutting device 112. In some other implementations, the cutting controller 122 is integrated as a component of the cutting device 112. Moreover, the cutting controller 122 is a component of a cloud service (not shown) that is communicatively coupled to the cutting device 112 in some other implementations.

The cutting controller 122 stores one or more nesting scripts 124 and one or more cutting scripts 126. In some implementations, the cutting controller 122 generates one or more of the nesting scripts 124 and/or one or more of the cutting scripts 126. Each nesting script 124 provides instructions for nesting a corresponding layup of the base material on the layup surface 110 of the layup table 102. Specifically, each nesting script 124 provides the cutting device 112 with various parameters (e.g., the number of plies, the arrangement of the various plies, the orientation of the various plies, the position of the various plies, the particular base material being used, etc.) of the corresponding layup that enable the cutting device 112 to nest (e.g., arrange, etc.) the base material on the layup surface 110 of the layup table 102. In some other implementations, one or more nesting scripts 124 provides instructions for nesting the corresponding layup(s) to another device (e.g., a feeding device, a pick and place device, etc.) and/or a human operator (e.g., for at least partially manually nesting the base material on the layup surface 110, etc.). In some implementations wherein one or more nesting scripts 124 provides instructions for nesting the corresponding layup(s) to another device, the nesting script(s) 124 are stored by the other device (and/or a controller of the other device) in addition or alternatively to being stored by the cutting controller 122.

Each cutting script 126 stored by the cutting controller 122 provides instructions for cutting the part(s) of a corresponding layup of the base material on the layup surface 110. Specifically, each cutting script 126 provides the cutting device 112 with the paths and dimensions of the various cuts of the corresponding layup that enable the cutting device 112 to cut the part(s) from the corresponding layup. The cutting controller 122 stores one or more MBDs in some implementations.

The inspection system 104 is configured (e.g., positioned, oriented, programmed, connected, provided with maneuverability and/or range, etc.) to inspect the part(s) that have been cut by the cutting device 112 and provide the results of the inspection as representative inspection data. An individual part that has been cut by the cutting device 112 will be referred to herein as a "cut part". In some implementations, the inspection system 104 is configured to inspect the cut parts while the cut parts are still on the layup table 102 (e.g., directly after the parts have been cut by the cutting device 112, etc.). In other implementations, the inspection system 104 is configured to inspect the cut parts after the cut parts have been moved from the layout table 102 to another location (e.g., a dedicated inspection station, etc.).

In some implementations, the inspection system 104 stores one or more inspection scripts 128. Each inspection script 128 provides instructions for inspecting one or more parts of a corresponding layup of the base material on the layup surface 110. Specifically, each inspection script 128 provides the inspection system 104 with instructions for obtaining inspection data (e.g., dimensions, profiles, paths, shapes, angles, radii of curvature, weight, etc.) of the cut parts that can be compared by the AI client 108 with corresponding data (e.g., dimensions, profiles, paths, shapes, angles, radii of curvature, weight, etc.) of the corresponding MBDs. The inspection data provided by the inspection system 104 thus enables a cut part to be verified as compliant with (e.g., within allowed tolerances, substantially matching, without a predetermined number of deviations from, etc.) the corresponding MBD. In some implementations, the inspection system 104 stores one or more MBDs.

The inspection system 104 includes any type of inspection device that enables the inspection system 104 to provide inspection data that can be compared by the AI client 108 with the corresponding data of the corresponding MBDs. One example of a type of inspection device that the inspection system includes, in some implementations, is an imaging device (e.g., a photo camera, a video camera, an electronic tracing device, etc.) that provides visual inspection data (e.g., visual images, traces, etc.) of the cut parts. As will be described in more detail below, the visual inspection data is compared with corresponding visual data (e.g., images, drawings, templates, etc.) of the corresponding MBDs to at least partially determine compliance of the cut parts with the corresponding MBDs. In some implementations, the imaging device is positioned in an overhead position relative to the layup table 102 such that the imaging device provides visual inspection data as plan view images of the cut parts.

Another example of a type of inspection device included by the inspection system in some implementations is a dimensional measurement device (e.g., a laser measurement device, an optical measurement device, etc.) that is configured to provide the inspection data as dimensional measurements (e.g., length, height, width, area, degree of angle, radius of curvature, etc.) of the cut parts. As will be described in more detail below, the dimensional measurements are compared with corresponding dimensional measurements of the corresponding MBDs to at least partially determine compliance of the cut parts with the corresponding MBDs. In some implementations, one or more other types of inspection devices are used in addition or alternatively to imaging devices and/or dimensional measurement devices to provide inspection data. For example, in some implementations the inspection system 104 includes a scale device configured to weigh the cut parts and provide the inspection data as weights of the cut parts. The inspection system 104 includes any number of different types of inspection devices and any number of inspection devices overall.

Each of the inspection devices of the inspection system 104 includes any configuration (e.g., structure, mechanism, device, hardware, software, etc.) that enables the inspection device to obtain the inspection data. In some implementations an inspection device includes a robotic arm that enables the inspection system to maneuver into position to obtain the inspection data. For example, FIG. 3 illustrates an inspection system 304 having a robotic arm 330. Some implementations of the inspection system 104 include an inspection device that includes a ring structure (e.g., fixed in place at least partially surrounding the layup table 102, moveable relative to the layup table 102 to at least partially surround the layup table 102, a dedicated inspection station, etc.) that enables the inspection device to obtain the inspection data. In addition or alternatively, other configurations of the inspection devices are used to enable the inspection system 104 to obtain the inspection data.

In some implementations, a portion or the entirety of the inspection system 104 is integrated into the layup table 102 as a component of the layup table 102. For example, FIG. 2 illustrates an inspection system 204 that is integrated into the layup table 202. Moreover, and for example, the inspection system 104 is integrated into the cutting device 112 (e.g., within a cutting head of the cutting device, etc.) in some implementations. In other implementations, the inspection system 104 is not integrated into the layup table 102 or the cutting device 112 but rather is a separate component of the system 100, for example as is shown in FIG. 1. In some implementations, the inspection system 104 is communicatively coupled to the cutting control 122 and/or is at least partially controlled by the cutting controller 122 (e.g., the cutting controller 122 generates one or more inspection scripts 128, the cutting controller 122 stores one or more inspection scripts 128, etc.).

Referring now to the electronic device 106, the electronic device 106 represents any device executing instructions (e.g., as application programs/software, operating system functionality, or both) to implement the operations and functionality associated with the electronic device 106. In some implementations, the electronic device 106 includes a mobile electronic device or any other portable device, for example a mobile telephone, laptop, tablet, computing pad, netbook, and/or the like. In some implementations, the electronic device 106 includes less portable devices, for example desktop personal computers, servers, kiosks, tabletop devices, industrial control devices, and/or the like. The electronic device 106 represents a group of processing units, servers, other computing devices, and/or the like in some implementations.

The electronic device 106 includes platform software comprising an operating system (OS) and/or any other suitable platform software to enable application software to be executed on the electronic device 106. The electronic device 106 includes internal hardware 110, for example video (graphic) cards, sound cards, network cards, television tuners, radio tuners, processors, motherboards, memories, hard drives, media drives, batteries, power supplies, and/or the like. In some implementations, the electronic device 106 includes external hardware, for example input devices (e.g., keyboards, trackpads, a mouse, microphones, cameras, drawing tablets, headsets, scanners, etc.), output devices (e.g., monitors, televisions, printers, speakers, fax machines, etc.), external hard drives, wireless routers, surge protectors, internet of things (IoT) devices, other peripherals, and/or the like.

As described above, the electronic device 106 includes the AI client service 108. In other implementations, the AI client service 108, or the electronic device 106 overall, is a component of a cloud service. The AI client service 108 is communicatively coupled to the inspection system 104 and the cutting controller 122. In some implementations, the AI client service 108 is communicatively coupled directly to the cutting device 112. The AI client service 108 is configured to receive one or more MBDs that correspond to one or more cut parts that have been cut by the cutting device 112. The AI client service 108 receives MBDs from any suitable source(s) (e.g., a cloud service, a design entity 132, the cutting controller 122, the inspection system 104, etc.). In some implementations, the design entity 132 generates one or more of the MBDs. The electronic device 106 stores one or more MBDs in some implementations.

The AI client service 108 receives inspection data obtained by the inspection system 104. Specifically, the AI client service 108 receives from the inspection system 104 inspection data obtained by the inspection system 104 for the cut parts that have been cut by the cutting device 112. The AI client service 108 compares the received inspection data for a cut part to the corresponding MBD to determine any deviations of the cut part from the MBD. For example, the AI client service 108 compares various dimensions, profiles, paths, shapes, angles, radii of curvature, weight, and/or the like of the inspection data of the cut part to the corresponding dimensions, profiles, paths, shapes, angles, radii of curvature, weight, and/or the like of the corresponding MBD.

The comparison performed by the AI client service 108 enables the AI client service 108 to determine any deviations of the inspection data from the corresponding MBD of the cut part. For example, the AI client service 108 determines any deviations that exist between the various dimensions, profiles, paths, shapes, angles, radii of curvature, weight, and/or the like of the inspection data of the cut part and the corresponding dimensions, profiles, paths, shapes, angles, radii of curvature, weight, and/or the like of the corresponding MBD. In some implementations, the AI client service 108 determines whether inspection data (e.g., a dimension, an angle, a radii of curvature, a weight, etc.) of the cut part is within a predetermined tolerance defined by the corresponding MBD.

In some implementations, the AI client service 108 compares visual inspection data with corresponding visual data (e.g., images, drawings, templates, etc.) of the corresponding MBDs to determine deviations of the inspection data of the cut part from the corresponding MBD. For example, in some implementations the AI client service 108 uses visual inspection data to determine whether one or more shapes (e.g., an overall shape, the shape of a side, the profile of a side, the path of an edge, the profile of an edge, etc.) of the cut part differs from the corresponding shape of the corresponding MBD (e.g., by comparing the visual inspection data with an image, drawing, template and/or the like of the corresponding MBD, etc.). Moreover, and for example, in some implementations the AI client service 108 uses visual inspection data to determine whether one or more angles of the cut part differs from the corresponding angle of the corresponding MBD. Another example includes the AI client service 108 using visual inspection data to determine whether one or more radii of curvature of the cut part differs from the corresponding radii of curvature of the corresponding MBD.

In some implementations, the AI client service 108 compares dimensional measurements (e.g., length, height, width, area, degree of angle, radius of curvature, etc.) of the inspection data with corresponding dimensional measurements of the corresponding MBD to determine deviations of the inspection data of the cut part from the corresponding MBD. For example, in some implementations, the AI client service 108 uses one or more dimensional measurements of the inspection data to determine whether one or more dimensions of the cut part differs from the corresponding dimension of the corresponding MBD. Moreover, and for example, in some implementations the AI client service 108 uses one or more weights of the inspection data to determine whether one or more weights of the cut part differs from the corresponding weight of the corresponding MBD.

The AI client service 108 determines whether the cut part is defective (i.e., non-compliant with the corresponding MBD) based on the comparison of the inspection data of the cut part to the corresponding MBD. In other words, the AI client service 108 uses the comparison to verify whether the cut part is compliant with the corresponding MBD. The AI client 108 uses any type(s) and/or number of deviations of the cut part from the corresponding MBD to determine that the cut part is defective. For example, in some implementations the AI client service 108 determines that the cut part is defective based on the number of deviations found from the comparison (e.g., when the number of deviations is equal to or greater than a predetermined number of deviations, etc.). Another example of a parameter used by the AI client 108 to determine whether the cut part is defective includes the amount of one or more deviations of the inspection data from the corresponding MBD (e.g., whether the amount of one or more deviations is greater than a predetermined threshold, etc.). For example, in some implementations the AI client 108 determines that the cut part is defective when one or more dimensions (e.g., length, height, width, area, degree of angle, radius of curvature, etc.) of the cut part is not within a tolerance defined for the corresponding dimension of the corresponding MBD. Moreover, and for example, in some implementations the AI client 108 determines that the cut part is defective when one or more weights of the cut part is not within a tolerance defined for the corresponding weight of the corresponding MBD. Yet another example includes the AI client 108 determining that the cut part is defective when one or more shapes (e.g., an overall shape, the shape of a side, the profile of a side, the path of an edge, the profile of an edge, etc.) of the cut part does not substantially match (e.g., differs by a predetermined percentage, differs by a predetermined dimensional value, differs visually by a predetermined amount, etc.) the corresponding shape of the corresponding MBD.

In some other implementations, some or all of the comparison of the inspection data of the cut parts with the corresponding MBDs is performed by the inspection system 104 or another system that includes processing functionality (e.g., a controller, a server, a cloud-based processor, etc.) in addition or alternatively to being performed by the AI client service 108. Moreover, in some other implementations some or all of the determination of whether the cut parts are defective is performed by the inspection system 104 or another system that includes processing functionality in addition or alternatively to being performed by the AI client service 108.

In some implementations, the inspection system 104 only inspects some of the cut parts of the same layup and the AI client 108 determines whether all of the cut parts of the layup comply with the corresponding MBD(s) based on the inspection data of the cut parts that have been inspected. For example, when the layup includes two or more plies of the base material, in some implementations the inspection system 104 only inspects the cut parts that are exposed on the top of the layup (e.g., one or more uppermost plies, etc.), and the AI client 108 determines whether the unexposed (e.g., the underlying, etc.) cut parts are defective or comply with the corresponding MBD(s) based on the compliance determination of the corresponding cut parts that have been inspected. The implementation of the layup 314 of FIG. 3 will now be used to illustrate such an example. Specifically, in some implementations of the layup 314 shown in FIG. 3, the inspection system 104 only obtains inspection data for the cut parts 318a, 318b, 318c, 320a, and 320b that are exposed along the upper side of the layup 314, and the AI client 108 determines whether the cut parts 318d and 318g are defective or in compliance based on whether the cut part 318a is defective or in compliance. Similarly, the AI client 108 determines: (1) whether the cut parts 318e and 318h are defective or in compliance based on whether the cut part 318b is defective or in compliance; (2) whether the cut parts 318f and 318i are defective or in compliance based on whether the cut part 318c is defective or in compliance; (3) whether the cut part 320c is defective or in compliance based on whether the cut part 320a is defective or in compliance; and (4) whether the cut part 320d is defective or in compliance based on whether the cut part 320b is defective or in compliance.

Referring again solely to FIG. 1, if the AI client 108 determines that a cut part of a layup is not defective (i.e., complies with the corresponding MBD), the cut part is either automatically or manually (e.g., by a human operator, etc.) moved to a storage location for future use or to a processing station for further processing (e.g., impregnating, laminating, curing, folding, forming, molding, assembling, further inspection, etc.) to complete the finished composite structure. For example, in some implementations the AI client 108 instructs a pick and place system (not shown) to automatically move the cut part that complies with the corresponding MBD (i.e., has passed inspection) from the layup table 102 to a receiving tray for complying cut parts. In other implementations, and for example, the cut part that complies with the corresponding MBD is moved manually from the layup table 102 to the receiving tray for complying cut parts.

If the AI client 108 determines that a cut part of a layup is defective, the defective part is automatically or manually moved to a trash location, automatically or manually moved to a recycle location, automatically or manually moved to a storage location for reuse at a later time (e.g., to be revised as described below, etc.), or remains on the layup table 102 so the defective part can be revised on the layup table 102 as is described below. For example, in some implementations the AI client 108 instructs the pick and place system to automatically move the defective part from the layup table 102 to a receiving tray for defective parts, while in other implementations the defective part is moved manually from the layup table 102 to the receiving tray for defective parts.

The pick and place system includes any structure that enables the pick and place system to move defective and complying parts from the layup table 102 to the corresponding receiving tray (e.g., a mobile arm, a vacuum head, a robotic arm and/or other structure, a gantry, etc.). In some implementations, the AI client 108 (and/or the inspection system 104) provides an indication for the human operator, the pick and place system, and/or another automated movement system that indicates whether a cut part has passed the inspection and thereby complies with the corresponding MBD or is defective (i.e., has failed the inspection and is thus non-compliant with the corresponding MBD). For example, cut parts determined as compliant with the corresponding MBD are illuminated with a color of light (e.g., green, etc.), while cut parts determined as defective are illuminated with a different color of light (e.g., white, red, etc.).

As briefly described above, when a cut part is determined to be defective, the AI client service 108 updates a digital thread corresponding to one or more parts cut by the cutting device 112. Specifically, as the AI client service 108 is communicatively coupled to the cutting controller 122 (and thereby indirectly to the cutting device 112) and the inspection system 104. In some implementations, the AI client service 108 is communicatively coupled to the design entity 132 (e.g., an entity responsible for design of the parts being cut by the cutting device, etc.) for communicating with the design entity 132. The communicative coupling between the AI client service 108 and the cutting controller 122, the inspection system 104, and/or the design entity 132 provides a common digital thread between multiple design, source, fabrication (e.g., cutting, etc.), and inspection stages to draw out critical manufacturing as-fabricated data for comparison to as-designed and/or specified process data, for example to enable root cause analysis when product specifications differ from predefined engineering specifications.

In some implementations, the AI client service 108 updates the digital thread by instructing the cutting controller 122 to recut defective part(s) from new base material. Specifically, a new layup of one or more plies of the base material is arranged (i.e., nested) on the layup surface 110 of the layup table 102 and the cutting device 112 cuts the layup to cut one or more new replacement parts that replaces the defective part(s). In some implementations, the AI client service 108 updates the digital thread by revising the nesting script 124 of the layup prior to cutting the replacement part(s). For example, if one or more of the cut parts of the layup is determined as compliant with the corresponding MBD, in some implementations the AI client service 108 revises the nesting script 124 to use only the amount of material necessary to cut the replacement part(s). In this way, the AI client service 108 reduces the amount of material used to cut a given number of parts, thereby increasing efficiency, reducing costs, etc. Moreover, such automated revision of the nesting script 124 by the AI client service 108 is less time consuming as compared to manual revision of the nesting script 124 by a human operator, thereby increasing efficiency (e.g., reducing the time required to cut a given number of parts, increasing the number of parts cut within a given time period, etc.), reducing costs, etc.

When cutting the replacement part(s) from a new layup, in some implementations the AI client service 108 updates the digital thread by revising the cutting script 126 of the layup containing the defective part(s) in addition or alternatively to revising the nesting script 124. For example, the cutting script 126 is revised to accommodate the revised nesting script 124 in some implementations. Moreover, and for example, in some implementations the AI client service 108 is configured to perform an analysis of the deviation(s) of the defective part(s) from the corresponding MBD to determine one or more root causes of the deviations. The cutting script 126 is then revised (e.g., changing the path of a cut, changing the length of a cut, changing the depth of a cut, etc.) by the AI client service 108 to alleviate the root cause(s) of the deviation(s) during cutting of the replacement part(s) in some implementations. In addition or alternatively to the cutting script 126, in some implementations the nesting script 124 and/or one or more corresponding dedicated MBDs of one or more defective parts is revised (e.g., changing an orientation of the layup, revising a tolerance of a dimension, etc.) by the AI client 108 to alleviate the root cause(s) of one or more deviations. By "dedicated MBD", it is meant that the AI client service 108 only revises the MBD for the defective part(s) that have been cut as opposed to a master MBD of the corresponding part. Automatic revision of a nesting script 124, a cutting script 126, and/or an MBD by the AI client service 108 is less time consuming as compared to manual revision by a human operator, thereby increasing efficiency (e.g., reducing the time required to cut a given number of parts, increasing the number of parts cut within a given time period, etc.), reducing costs, etc.

In some implementations, the AI client service 108 updates the digital thread by instructing the cutting controller 122 to revise the defective part(s). Specifically, the cutting device 112 recuts the defective part(s) to alleviate one or more deviations from the corresponding MBD and thereby revise the defective part(s) to be compliant with the corresponding MBD. In this way, the AI client service 108 reduces the amount of material used to cut a given number of parts by revising the defective part(s) instead of replacing the defective part(s) using more base material, thereby increasing efficiency, reducing costs, etc. In some implementations, the AI client service 108 instructs the cutting device 112 to revise the defective part(s) in real time (i.e., on the fly) while the defective(s) parts of the layup remains on the layup table 102. In other implementations, the AI client service 108 instructs the cutting device 112 to revise the defective part(s) at a later time after the defective part(s) has been removed from the layup table 102 and later repositioned on the same or a different layup table 102. After being revised, in some implementations the inspection system 104 reinspects the revised part(s) and the AI client system 108 verifies whether the revised part(s) is compliant.

Some implementations of the AI client service 108 update the digital thread by revising the nesting script 124 of the layup, the portion of the cutting script 126 that corresponds to the parts being recut, and/or one or more corresponding dedicated MBDs prior to re-cutting the defective part(s). For example, as described above, in some implementations the AI client service 108 is configured to perform an analysis of the deviation(s) of the defective part(s) from the corresponding MBD(s) to determine one or more root cause(s) of the deviations. The nesting script 124, the portion of the cutting script 126 that corresponds to the parts being recut, and/or one or more corresponding dedicated MBDs is revised by the AI client server 108 in some implementations to alleviate the root cause(s) of the deviation(s) during re-cutting of the defective part(s). For example, some implementations include revising the nesting script 124 to change an orientation of the part(s) being revised, to accommodate any revisions to the cutting script 126 and/or one or more corresponding dedicated MBDs, and/or the like. In some implementations, for example, the cutting script 126 is revised by the AI client server 108 to change the path of a cut, change the length of a cut, change the depth of a cut, to accommodate any revisions to the nesting script 124 and/or one or more corresponding dedicated MBDs, and/or the like. Moreover, and for example, in some implementations one or more corresponding dedicated MBDs is revised by the AI client server 108 to change one or more tolerances, to accommodate any revisions to the nesting script 124 and/or the cutting script 126, and/or the like. As described above, automatic revision of a nesting script 124, a cutting script 126, and/or an MBD by the AI client service 108 is less time consuming as compared to manual revision by a human operator, thereby increasing efficiency (e.g., reducing the time required to cut a given number of parts, increasing the number of parts cut within a given time period, etc.), reducing costs, etc.

In some implementations, the AI client service 108 updates the digital thread by storing information related to one or more defective parts. The information related to the defective parts stored by the AI client server 108 is stored directly by the AI client service 108 (e.g. on a memory of the electronic device 106, etc.) in some implementations, while in other implementations the information related to the defective parts is indirectly stored by the AI client service 108 on another device (e.g., a cloud service, a controller, a server, a memory external to the electronic device 106, another electronic device, etc.) and is accessible by the AI client service 108. Examples of information stored by the AI client service 108 include, but are not limited to, one or more of the following: information related to the comparison of the inspection data to the corresponding MBD; one or more deviations determined between a defective part and the corresponding MBD; the type of base material of a defective part; a current master MBD of a part; one or more past revisions to a dedicated MBD of a defective part (e.g., made to alleviate the deviation(s) of the defective part, etc.); one or more past revisions to the master MBD of a part (e.g., made to alleviate the deviation(s) of a defective part, design changes, etc.); one or more current master cutting scripts 126 of a layup and/or a part; one or more past revisions to the cutting script(s) of a defective part and/or a layup containing one or more defective parts, (e.g., made to alleviate the deviation(s) of a defective part, made to accommodate a design change, made to accommodate a change to a nesting script 124, etc.); one or more past revisions to the master cutting script(s) of a layup and/or a part (e.g., made to alleviate the deviation(s) of a defective part, made to accommodate a design change, made to accommodate a change to a nesting script 124, etc.); one or more current master nesting scripts 124 of a layup and/or a part; one or more past revisions to the nesting script(s) of a defective part and/or a layup containing one or more defective parts, (e.g., made to alleviate the deviation(s) of a defective part, made to accommodate a design change, made to accommodate a change to a cutting script 126, etc.); one or more past revisions to the master nesting script(s) 124 of a layup and/or a part (e.g., made to alleviate the deviation(s) of a defective part, made to accommodate a design change, made to accommodate a change to a cutting script 126, etc.); the particular cutting device 112 that produced one or more defective parts; the number of individual defective parts of one or more different parts that have been produced over a given time period; the number of individual defective parts of one or more different parts that have been produced by a particular cutting device 112; and/or the like.

The information related to the defective parts that is stored by the AI client service 108 enables the AI client service 108 to update the digital thread by tracking the occurrence of defective parts over time for one or more different parts. In some implementations, the AI client service 108 updates the digital thread by analyzing (e.g., using the stored information related to one or more defective parts, etc.) the occurrence of defective parts over time to determine and take one or more actions that reduce, eliminate, mitigate, alleviate, and/or the like future occurrences of defective parts for one or more different parts.

Examples of actions taken by the AI client service 108 based on the analyzation of the occurrence of defective parts over time include, but are not limited to, one or more of the following; one or more revisions to a master cutting script 126 of a layup and/or a part, one or more revisions to a master nesting script 124 of a layup and/or a part, and/or one or more revisions to a master MBD of a part. Moreover, another example of an action taken by the AI client service 108 to update the digital thread based on the above-described analyzation includes communicating with the design entity 132 in some implementations, for example to revise a master MBD of one or more parts (e.g., to make one or more design changes, change one or more tolerances, etc.). In some implementations, examples of such communication with the design entity 132 by the AI client service 108 include at least some of the information stored by the AI client service 108 described above, for example one or more of the following: information relating to the comparison of the inspection data to the MBD of a part; the occurrence of defective parts over time; information relating to past occurrences of defective parts, etc.

Yet another example an action taken by the AI client service 108 to update the digital thread based on the above-described analyzation includes, in some implementations, determining that a predetermined number of defective parts are being produced by a particular cutting device 112. In such an example, some implementations of the AI client service 108 recommend that the offending cutting device 112 be taken out of service, be subjected to maintenance and/or repair, etc. The analyzation and actions taken therefrom by the AI client service 108 enable the AI client service 108 to reduce, eliminate, mitigate, alleviate, and/or the like future occurrences of defective parts for one or more different parts.

In some implementations, the AI client service 108 comprises a trained regressor (e.g., a random decision forest, directed acyclic graph, support vector machine, neural network, other trained regressor, etc.). Examples of trained regressors include, but are not limited to, a convolutional neural network, a random decision forest, and/or the like. It should further be understood that the AI client service 108, in some implementations, operates according to machine learning principles and/or techniques known in the art without departing from the systems and/or methods described herein.

The AI client service 108 comprises software stored in memory and executed on a processor in some implementations. In some implementations, the AI client service 108 is executed on a Field-programmable Gate Array (FPGA) or a dedicated chip. For example, the functionality of the AI client service 108 is implemented, in whole or in part, by one or more hardware logic components in some implementations. Examples of types of hardware logic components include, but are not limited to, FPGAs, Application-specific Integrated Circuits (ASICs), Application-specific Standard Products (ASSPs), System-on-a-chip systems (SOCs), Complex Programmable Logic Devices (CPLDs), Graphics Processing Units (GPUs), and/or the like.

The AI client service 108 makes use of training data pairs when applying machine learning techniques and/or algorithms in some implementations (e.g., millions of training data pairs (or more) stored in a machine learning data structure, etc.). In some implementations, a training data pair includes an input or feedback data value paired with a criteria update value. For example, the pairing of the two values demonstrates a relationship between the input or feedback data value and the criteria update value that is used by the AI client service 108 to determine future criteria updates according to machine learning techniques and/or algorithms.

Figure 4:
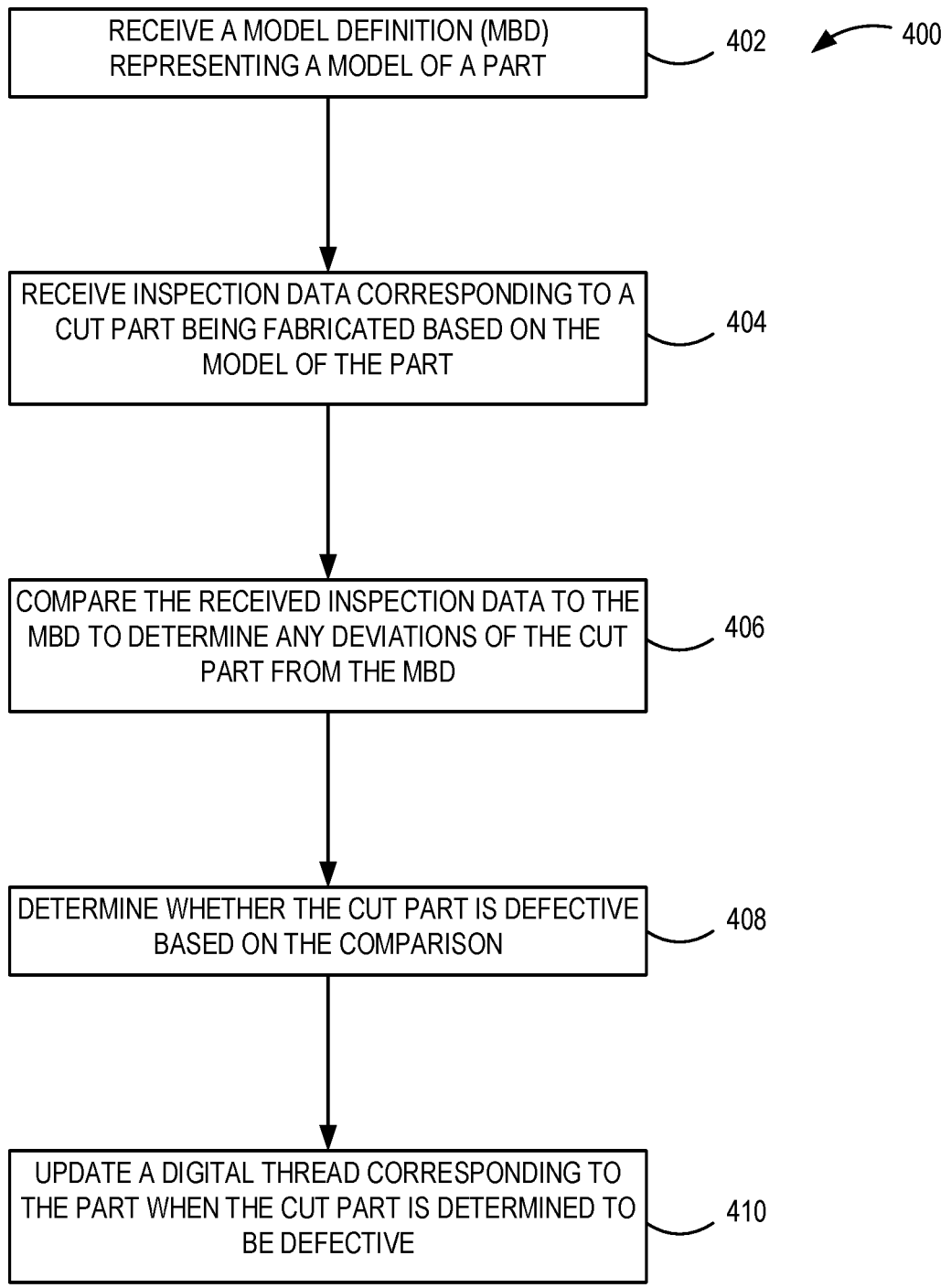
FIG. 4 is a flow chart illustrating a method of automated inspection using artificial intelligence (AI) according to an implementation.
Figure 5:
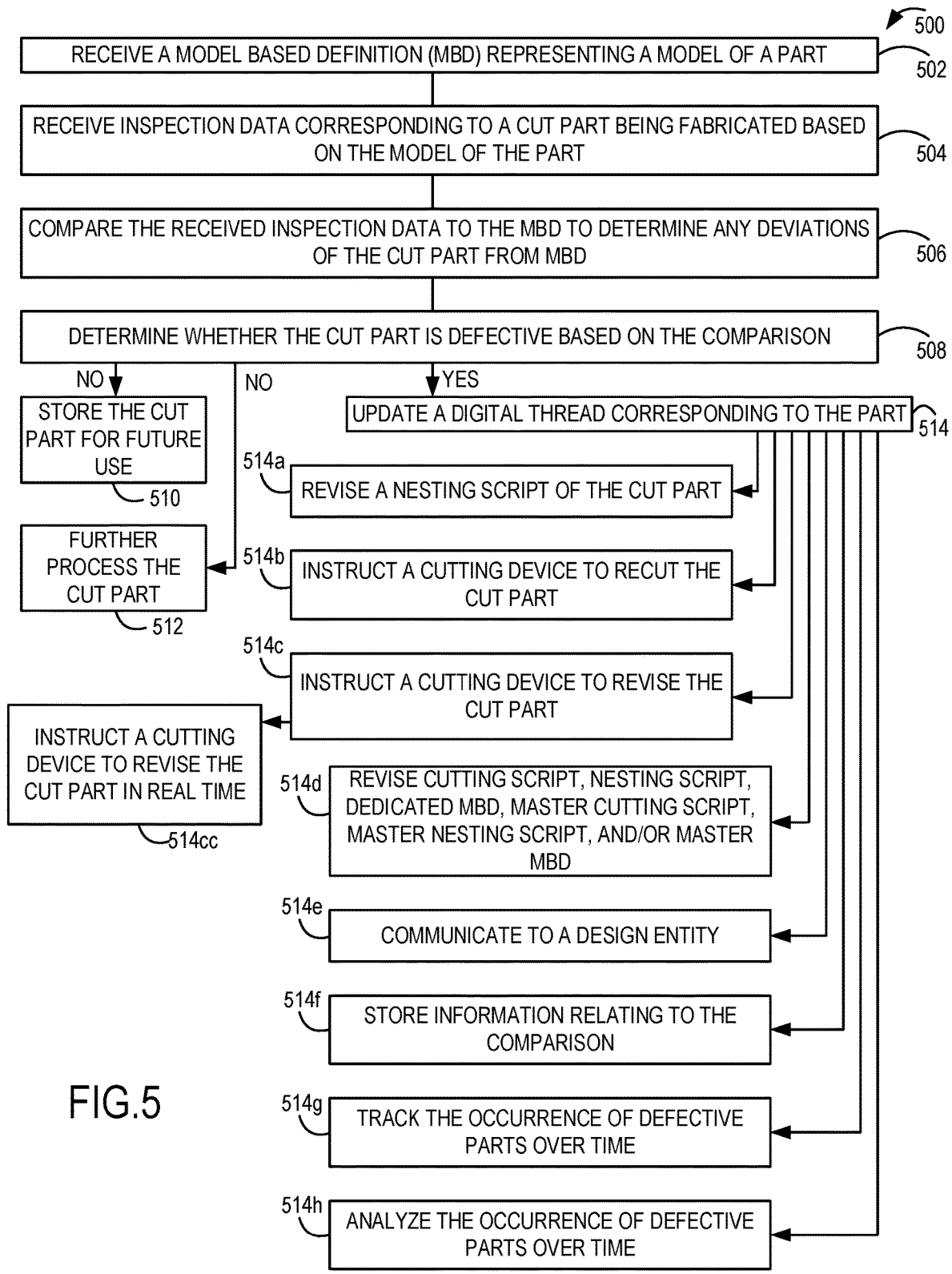
FIG. 5 is a flow chart illustrating another method of automated inspection using artificial intelligence (AI) according to an implementation.

The AI client service 108 is arranged to execute the methods described herein with respect to FIGS. 4 and 5 to determine updates to the digital thread. In some implementations, updates to the digital thread determined by the AI client service 108 include a prompt to a user informing the user of the automatic update, along with a selection to confirm or reject the automatic update.

FIG. 4 illustrates a flow chart of a method 400 for automated inspection using AI according to an implementation. The method 400 is performed by an electronic device, for example the electronic device 106, and includes receiving, at 402, a model based definition (MBD) representing a model of a part. At 404, the method 400 includes receiving inspection data corresponding to a cut part being fabricated based on the model of the part. The received inspection data is compared, at 406, to the MBD to determine any deviations of the cut part from the MBD. At 408, the method 400 includes determining whether the cut part is defective based on the comparison. At 410, the method 400 includes updating a digital thread corresponding to the part when the cut part is determined to be defective.

FIG. 5 illustrates another flow chart of a method 500 for automated inspection using AI according to an implementation. The method 500 is performed by an electronic device, for example the electronic device 106, and includes receiving, at 502, a model based definition (MBD) representing a model of a part. At 504, the method 500 includes receiving inspection data corresponding to a cut part being fabricated based on the model of the part. The received inspection data is compared, at 506, to the MBD to determine any deviations of the cut part from the MBD. At 508, the method 500 includes determining whether the cut part is defective based on the comparison. If the cut part is determined at 508 to not be defective (i.e., is compliant with the MBD), the method 500 includes storing, at 510, the cut part for future use or further processing, at 512, the cut part.

If the cut part is determined at 508 to be defective, the method 500 includes updating, at 514, a digital thread corresponding to the part. In some implementations, updating at 514 the digital thread includes revising, at 514a, a nesting script of the cut part. Updating at 514 the digital thread includes, in some implementations, instructing, at 514b, a cutting device to recut the cut part using new material. Moreover, in some implementations updating at 514 the digital thread includes instructing, at 514c, the cutting device to revise the cut part. Optionally, instructing at 514c the cutting device to revise the cut part includes instructing, at 514cc, the cutting device to revise the cut part in real time.

In some implementations, updating at 514 the digital thread includes revising, at 514d, at least one of a cutting script of the cut part, a nesting script of the cut part, a dedicated MBD of the cut part, a master cutting script of the part, a master nesting script of the part, or the master MBD.

Optionally, updating at 514 the digital thread includes communicating, at 514e, to a design entity at least one of information relating to the comparison of the inspection data to the MBD, the occurrence of defective parts over time, or information relating to past occurrences of defective parts.

In some implementations, updating at 514 the digital thread includes storing, at 514f, information relating to the comparison of the inspection data to the MBD. Moreover, updating at 514 the digital thread includes tracking, at 514g, the occurrence of defective parts over time. At 514h, updating the digital thread at 514 optionally includes analyzing the occurrence of defective parts over time.

Figure 6:
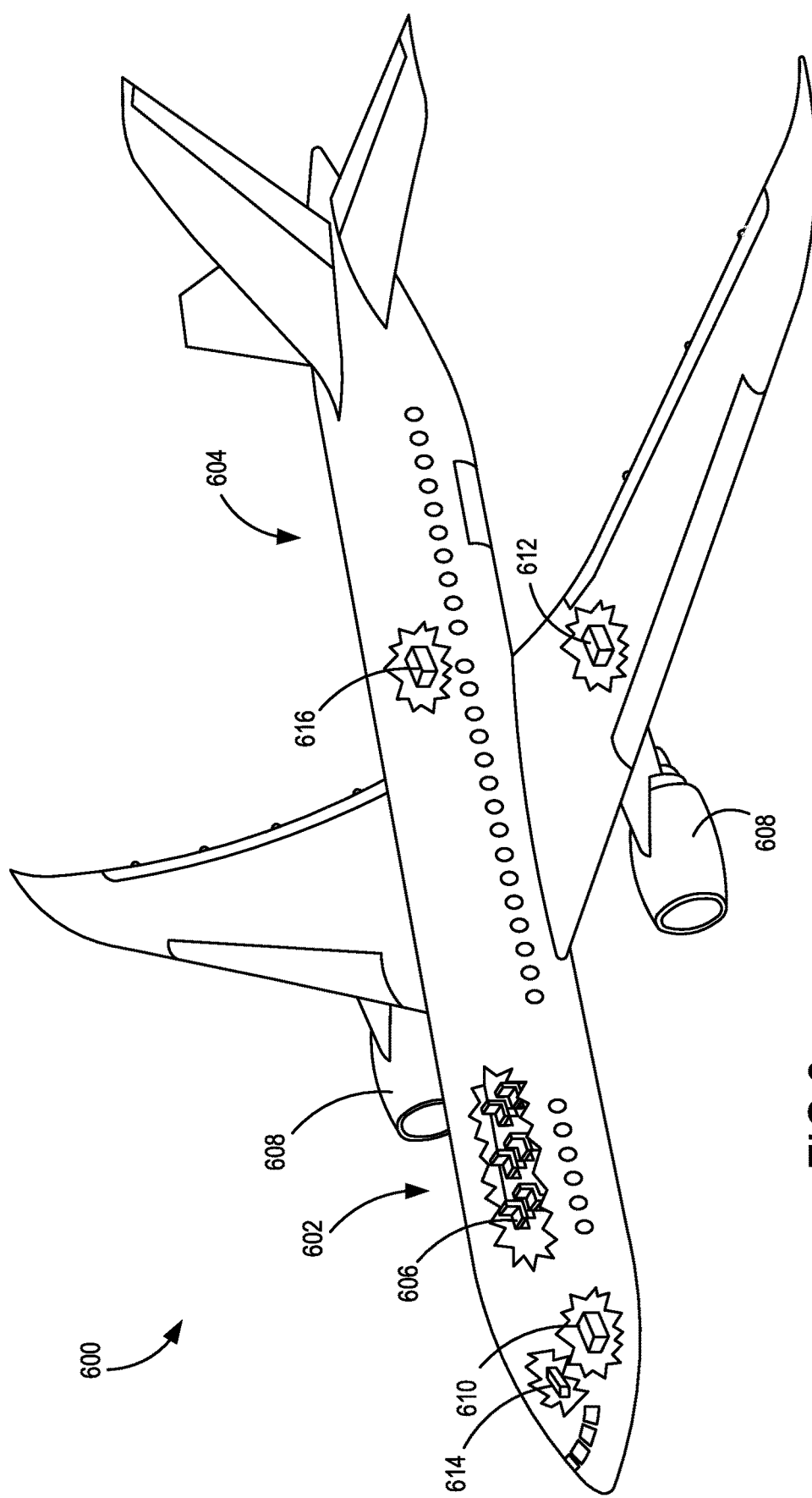
FIG. 6 is a schematic perspective view of an aircraft.

Referring now to FIG. 6, implementations of the disclosure are described in the context of an aircraft 600 having an airframe 602 with a plurality of high-level systems 604 and an interior 606. Examples of high-level systems 604 include one or more of a propulsion system 608, an electrical system 610, a hydraulic fluid system 612, a control system 614, and an environmental system 616. Any number of other systems can be included. Although an aerospace example is shown, the principles can be applied to other industries, such as, but not limited to, the automotive industry, the marine industry, etc.

Figure 7:
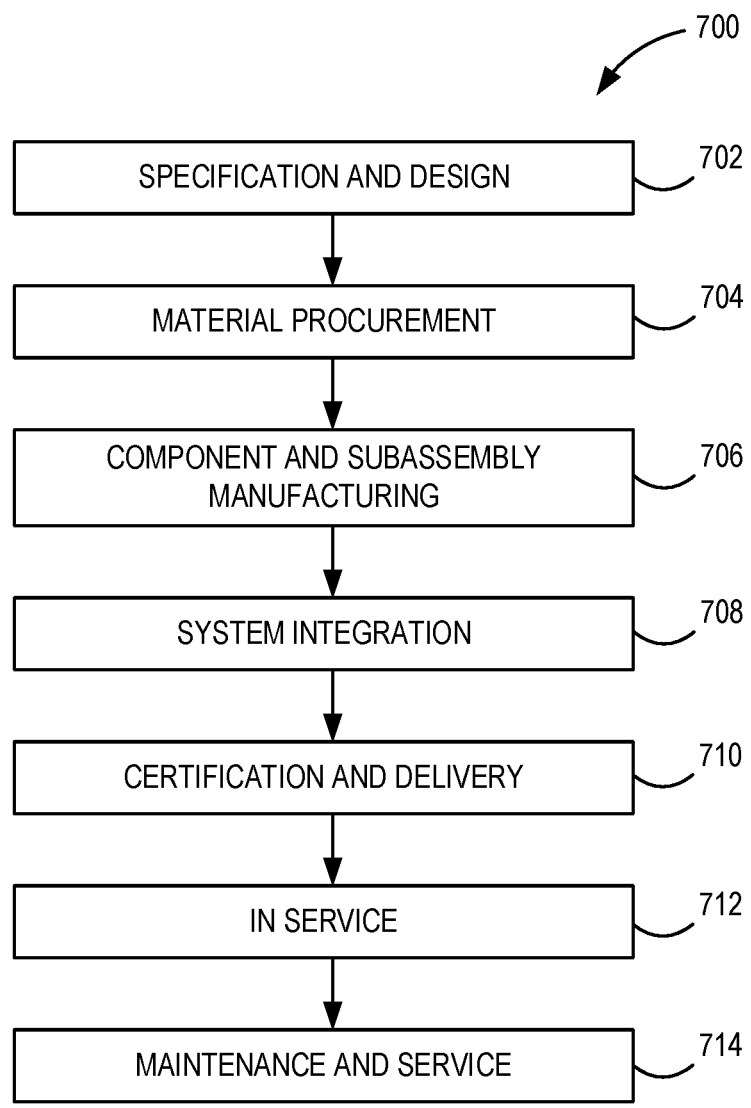
FIG. 7 is a block diagram of an aircraft production and service methodology.

Implementations of the disclosure can be described in the context of an aircraft manufacturing and service method 700 as shown in FIG. 7. During pre-production, illustrative method 700 includes specification and design 702 of an aircraft (e.g., aircraft 600 shown in FIG. 6) and material procurement 704. During production, component and subassembly manufacturing 706 and system integration 708 of the aircraft take place. Thereafter, the aircraft goes through certification and delivery 710 to be placed in service 712. While in service by a customer, the aircraft is scheduled for routine maintenance and service 714 (which in some implementations also includes modification, reconfiguration, refurbishment, and so on).

Each of the processes of the illustrative method 700 can be performed or carried out by a system integrator, a third party, and/or an operator (e.g., a customer). For the purposes of this description, a system integrator includes, without limitation, any number of aircraft manufacturers and major-system subcontractors; a third party includes, without limitation, any number of vendors, subcontractors, and suppliers; and an operator includes, without limitation, an airline, leasing company, military entity, service organization, and so on.

It should be noted that any number of other systems can be included with the system described herein. Also, although an aerospace example is shown, the principles can be applied to other industries, such as, but not limited to, the automotive industry, the marine industry, etc.

Systems and methods shown or described herein are, in some implementations, employed during any one or more of the stages of the manufacturing and service method 700. For example, components or subassemblies corresponding to component and subassembly manufacturing 706 are, in some implementations, fabricated or manufactured in a manner similar to components or subassemblies produced while the aircraft is in service. Also, one or more aspects of the system, method, or combination thereof are utilized, in some implementations, during the production states of subassembly manufacturing 706 and system integration 708, for example, by substantially expediting assembly of or reducing the cost of the aircraft. Similarly, in some implementations, one or more aspects of the apparatus or method realizations, or a combination thereof, are utilized, for example and without limitation, while the aircraft is in service, e.g., maintenance and service 714.

Exemplary Operating Environment

Figure 8:
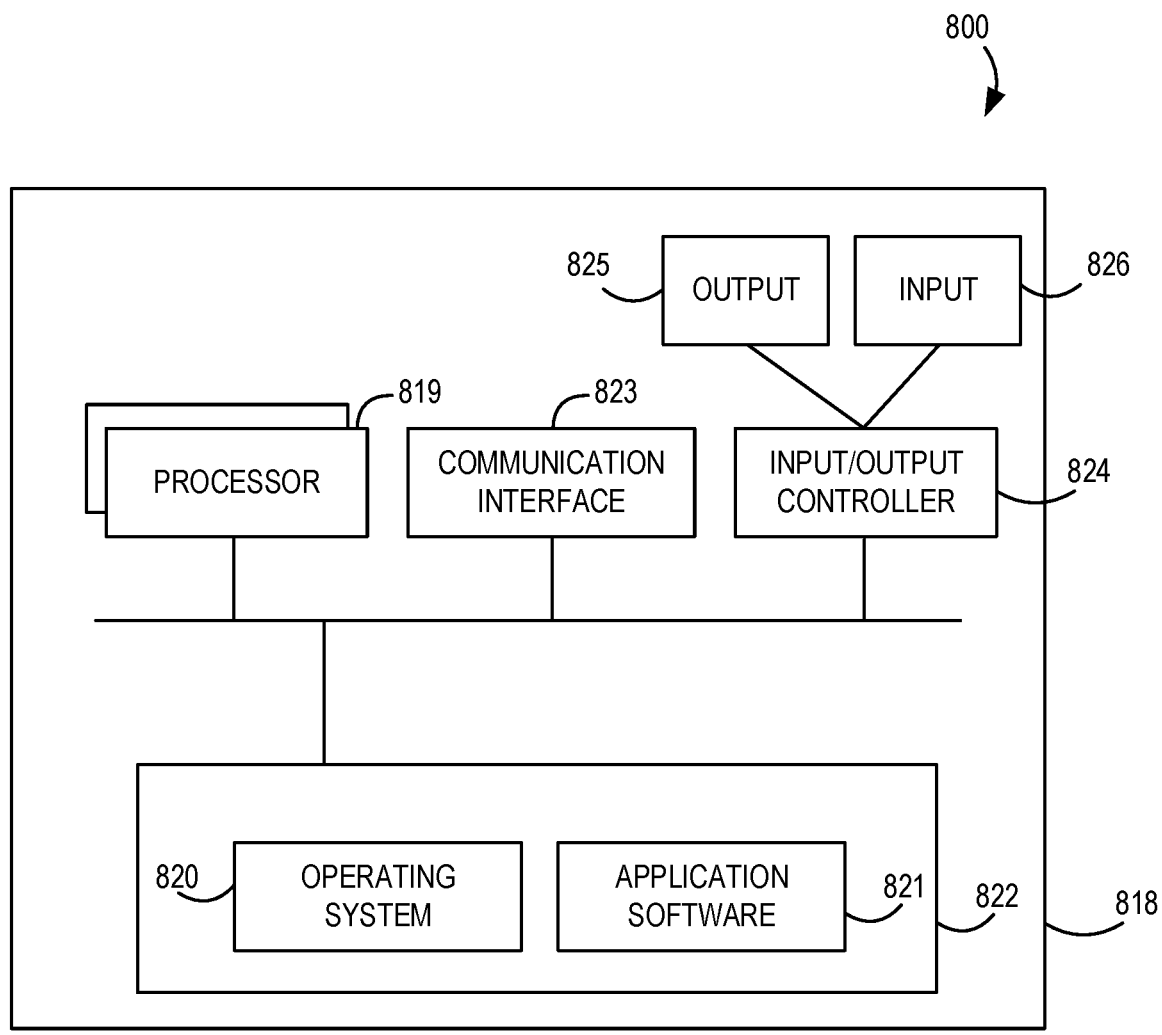
FIG. 8 illustrates an electronic device according to an implementation as a functional block diagram.

The present disclosure is operable with an electronic device (i.e., a computing apparatus) according to an implementation as a functional block diagram 800 in FIG. 8. In an implementation, components of a computing apparatus 818 are implemented as a part of an electronic device according to one or more implementations described in this specification. The computing apparatus 818 comprises one or more processors 819, for example microprocessors, controllers, and/or any other suitable type of processors for processing computer executable instructions to control the operation of the electronic device. In some implementations, platform software comprising an operating system 820 and/or any other suitable platform software is provided on the apparatus 818 to enable application software 821 to be executed on the device.

Computer executable instructions are provided using any computer-readable media that are accessible by the computing apparatus 818. Computer-readable media include, for example and without limitation, computer storage media such as a memory 822 and communications media. Computer storage media, such as a memory 822, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media embody computer readable instructions, data structures, program modules, and/or the like in a modulated data signal, such as a carrier wave and/or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 822) is shown within the computing apparatus 818, it will be appreciated by a person skilled in the art, that in some implementations the storage is distributed or located remotely and accessed via a network or other communication link (e.g. using a communication interface 823).

In some implementations, the computing apparatus 818 comprises an input/output controller 824 configured to output information to one or more output devices 825, for example a display and/or a speaker, which is separate from or integral to the electronic device. The input/output controller 824 is also configured, in some implementations, to receive and process an input from one or more input devices 826, for example, a keyboard, a microphone, and/or a touchpad. In one implementation, the output device 825 also acts as the input device. An example of such a device is a touch sensitive display. In some implementations, the input/output controller 824 also outputs data to devices other than the output device, e.g. a locally connected printing device. In some implementations, a user 827 provides input to the input device(s) 826 and/or receives output from the output device(s) 825.

In some implementations, the functionality described herein is performed, at least in part, by one or more hardware logic components. According to an implementation, the computing apparatus 818 is configured by the program code when executed by the processor 819 to execute the implementations of the operations and functionality described. Alternatively, or in addition, the functionality described herein is performed, at least in part, by one or more hardware logic components. For example, and without limitation, illustrative types of hardware logic components include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs), and/or the like.

Although some of the present embodiments are described and illustrated as being implemented in a server, controller, cloud service, smartphone, mobile phone, personal computer, and/or tablet computer, these are only examples of a device and not a limitation. As those skilled in the art will appreciate, the present implementations are suitable for application in a wide variety of different types of devices, such as portable and mobile devices, for example, in laptop computers, tablet computers, etc.

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, and/or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, microprocessor-based systems, set top boxes, programmable consumer electronics, mobile telephones, mobile computing and/or communication devices, network PCs, minicomputers, mainframe computers, distributed computing environments that include any of the above systems and/or devices, and/or the like. Such systems and/or devices may accept input from the user in any way, including from input devices such as a keyboard or pointing device, via gesture input, proximity input (for example by hovering), and/or via voice input.

Implementations of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects and implementations of the disclosure may be implemented with any number and organization of such components or modules. For example, aspects and implementations of the disclosure are not limited to the specific computer-executable instructions or the specific components or modules illustrated in the figures and described herein. Other examples of the disclosure may include different computer-executable instructions and/or components having more or less functionality than illustrated and described herein.

In examples involving a general-purpose computer, aspects and implementations of the disclosure transform the general-purpose computer into a special-purpose computing device when configured to execute the instructions described herein.

The examples and implementations illustrated and/or described herein as well as examples and implementations not specifically described herein but within the scope of aspects and implementations of the disclosure constitute exemplary means for automated inspection using AI. For example, the elements illustrated in FIG. 1, such as when encoded to perform the operations illustrated in FIGS. 4 and 5, constitute exemplary means for automated inspection using AI.

The following clauses describe further aspects:

Clause Set A:

A1. An electronic device comprising:
at least one processor;
at least one memory storing a model based definition (MBD) representing a model of a part; and
an artificial intelligence (AI) client service that, in response to execution by the at least one processor, is configured to:
    receive inspection data corresponding to a cut part being fabricated based on the model of the part;
    compare the received inspection data to the MBD to determine any deviations of the cut part from the MBD;
    determine whether the cut part is defective based on the comparison; and
    update a digital thread corresponding to the part when the cut part is determined to be defective.

A2. The electronic device of clause A1, wherein updating the digital thread by the AI client service, in response to execution by the at least one processor, comprises revising a nesting script of the cut part.

A3. The electronic device of clause A1, wherein updating the digital thread by the AI client service, in response to execution by the at least one processor, comprises instructing a cutting device to recut the cut part using new material.

A4. The electronic device of clause A1, wherein updating the digital thread by the AI client service, in response to execution by the at least one processor, comprises instructing a cutting device to revise the cut part.

A5. The electronic device of clause A1, wherein updating the digital thread by the AI client service, in response to execution by the at least one processor, comprises instructing a cutting device to revise the cut part in real time.

A6. The electronic device of clause A1, wherein the MBD is a master MBD of the part and updating the digital thread by the AI client service, in response to execution by the at least one processor, comprises revising at least one of a cutting script of the cut part, a nesting script of the cut part, a dedicated MBD of the cut part, a master cutting script of the part, a master nesting script of the part, or the master MBD.

A7. The electronic device of clause A1, wherein updating the digital thread by the AI client service, in response to execution by the at least one processor, comprises communicating to a design entity at least one of information relating to the comparison of the inspection data, the occurrence of defective parts over time, or information relating to past occurrences of defective parts.

A8. The electronic device of clause A1, wherein updating the digital thread by the AI client service, in response to execution by the at least one processor, comprises at least one of storing information relating to the comparison of the inspection data to the MBD, tracking the occurrence of defective parts over time, or analyzing the occurrence of defective parts over time.

A9. The electronic device of clause A1, wherein the inspection data comprises at least one of a dimensional measurement, visual inspection data, or a weight.

Clause Set B:

B1. A computerized method comprising:
receiving a model based definition (MBD) representing a model of a part;
receiving inspection data corresponding to a cut part being fabricated based on the model of the part;
comparing the received inspection data to the MBD to determine any deviations of the cut part from the MBD;
determining whether the cut part is defective based on the comparison; and
updating a digital thread corresponding to the part when the cut part is determined to be defective.

B2. The computerized method of clause B1, wherein updating the digital thread comprises revising a nesting script of the cut part.

B3. The computerized method of clause B1, wherein updating the digital thread comprises at least one of instructing a cutting device to recut the cut part using new material or instructing the cutting device to revise the cut part.

B4. The computerized method of clause B1, wherein the MBD is a master MBD of the part and updating the digital thread comprises revising at least one of a cutting script of the cut part, a nesting script of the cut part, a dedicated MBD of the cut part, a master cutting script of the part, a master nesting script of the part, or the master MBD.

B5. The computerized method of clause B1, wherein updating the digital thread comprises communicating to a design entity at least one of information relating to the comparison of the inspection data to the MBD, the occurrence of defective parts over time, or information relating to past occurrences of defective parts.

B6. The computerized method of clause B1, wherein updating the digital thread comprises at least one of storing information relating to the comparison of the inspection data to the MBD, tracking the occurrence of defective parts over time, or analyzing the occurrence of defective parts over time.

Clause Set C:

C1. One or more computer storage media having computer-executable instructions for leveraging artificial intelligence (AI) that, in response to execution by a processor, cause the processor to at least:
receive a model based definition (MBD) representing a model of a part;
receive inspection data corresponding to a cut part being fabricated based on the model of the part;
compare the received inspection data to the MBD to determine any deviations of the cut part from the MBD;
determine whether the cut part is defective based on the comparison; and
update a digital thread corresponding to the part when the cut part is determined to be defective.

C2. The one or more computer storage media of clause C1, wherein updating the digital thread by the processor comprises at least one of instructing a cutting device to recut the cut part using new material or instructing the cutting device to revise the cut part.

C3. The one or more computer storage media of clause C1, wherein the MBD is a master MBD and updating the digital thread by the processor comprises revising at least one of a cutting script of the cut part, a nesting script of the cut part, a dedicated MBD of the cut part, a master cutting script of the part, a master nesting script of the part, or the master MBD.

C4. The one or more computer storage media of clause C1, wherein updating the digital thread by the processor comprises communicating to a design entity at least one of information relating to the comparison of the inspection data to the MBD, the occurrence of defective parts over time, or information relating to past occurrences of defective parts.

C5. The one or more computer storage media of clause C1, wherein updating the digital thread by the processor comprises at least one of storing information relating to the comparison of the inspection data to the MBD, tracking the occurrence of defective parts over time, or analyzing the occurrence of defective parts over time.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one implementation or may relate to several implementations. The implementations are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples and implementations of the disclosure illustrated and described herein is not essential, unless otherwise specified. That is, the operations may be performed in any order, unless otherwise specified, and examples and implementations of the disclosure may include additional or fewer operations than those disclosed herein. For example, it is contemplated that executing or performing a particular operation before, contemporaneously with, or after another operation is within the scope of aspects of the disclosure.

When introducing elements of aspects and implementations of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects and implementations of the disclosure in detail, it will be apparent that modifications and variations are possible without departing from the scope of aspects and implementations of the disclosure as defined in the appended claims. As various changes could be made in the above constructions, products, and methods without departing from the scope of aspects and implementations of the disclosure, it is intended that all matter contained in the above description and shown in the accompanying drawings shall be interpreted as illustrative and not in a limiting sense.

What is claimed is:

1. An electronic device comprising:
   at least one processor;
   at least one memory storing a model based definition (MBD) representing a model of a part; and
   an artificial intelligence (AI) client service that, in response to execution by the at least one processor, is configured to:
   receive inspection data corresponding to a cut part being fabricated based on the model of the part;
   compare the received inspection data to the MBD to determine any deviations of the cut part from the MBD;
   determine whether the cut part is defective based on the comparison;
   analyze at least one deviation of the cut part from the MBD to determine at least one root cause of the at least one deviation; and
   update a digital thread corresponding to the part when the cut part is determined to be defective including automatically determining and automatically taking an action to alleviate the at least one root cause, wherein automatically taking the action to alleviate the at least one root cause comprises at least one of revising a cutting script, revising a nesting script, revising the MBD, taking a cutting device out of service, or subjecting a cutting device to at least one of maintenance or repair.

2. The electronic device of claim 1, wherein updating the digital thread by the AI client service, in response to execution by the at least one processor, comprises revising a nesting script of the cut part.

3. The electronic device of claim 1, wherein updating the digital thread by the AI client service, in response to execution by the at least one processor, comprises instructing a cutting device to recut the cut part using new material.

4. The electronic device of claim 1, wherein updating the digital thread by the AI client service, in response to execution by the at least one processor, comprises instructing a cutting device to revise the cut part.

5. The electronic device of claim 1, wherein updating the digital thread by the AI client service, in response to execution by the at least one processor, comprises instructing a cutting device to revise the cut part in real time.

6. The electronic device of claim 1, wherein the MBD is a master MBD of the part and updating the digital thread by the AI client service, in response to execution by the at least one processor, comprises revising at least one of a cutting script of the cut part, a nesting script of the cut part, a dedicated MBD of the cut part, a master cutting script of the part, a master nesting script of the part, or the master MBD.

7. The electronic device of claim 1, wherein updating the digital thread by the AI client service, in response to execution by the at least one processor, comprises communicating to a design entity at least one of information relating to the comparison of the inspection data to the MBD, the occurrence of defective parts over time, or information relating to past occurrences of defective parts.

8. The electronic device of claim 1, wherein updating the digital thread by the AI client service, in response to execution by the at least one processor, comprises automatically analyzing the occurrence of defective parts over time and automatically determining and automatically taking the action to reduce future occurrences of defective parts.

9. The electronic device of claim 1, wherein the inspection data comprises at least one of a dimensional measurement, visual inspection data, or a weight.

10. A computerized method comprising:
    receiving a model based definition (MBD) representing a model of a part;
    receiving inspection data corresponding to a cut part being fabricated based on the model of the part;
    comparing the received inspection data to the MBD to determine any deviations of the cut part from the MBD;
    determining whether the cut part is defective based on the comparison;
    analyzing at least one deviation of the cut part from the MBD to determine at least one root cause of the at least one deviation; and
    updating a digital thread corresponding to the part when the cut part is determined to be defective including automatically determining and automatically taking an action to alleviate the at least one root cause, wherein automatically taking the action to alleviate the at least one root cause comprises at least one of revising a cutting script, revising a nesting script, revising the MBD, taking a cutting device out of service, or subjecting a cutting device to at least one of maintenance or repair.

11. The computerized method of claim 10, wherein updating the digital thread comprises at least one of instructing a cutting device to recut the cut part using new material or instructing the cutting device to revise the cut part.

12. The computerized method of claim 10, wherein the MBD is a master MBD of the part and updating the digital thread comprises revising at least one of a cutting script of the cut part, a nesting script of the cut part, a dedicated MBD of the cut part, a master cutting script of the part, a master nesting script of the part, or the master MBD.

13. The computerized method of claim 10, wherein updating the digital thread comprises communicating to a design entity at least one of information relating to the comparison of the inspection data to the MBD, the occurrence of defective parts over time, or information relating to past occurrences of defective parts.

14. The computerized method of claim 10, wherein updating the digital thread comprises automatically analyzing the occurrence of defective parts over time and automatically determining and automatically taking the action to reduce future occurrences of defective parts.

15. The computerized method of claim 10, wherein updating the digital thread comprises instructing a cutting device to revise the cut part in real time.

16. One or more computer storage media having computer-executable instructions for leveraging artificial intelligence (AI) that, in response to execution by a processor, cause the processor to at least:
   receive a model based definition (MBD) representing a model of a part;
   receive inspection data corresponding to a cut part being fabricated based on the model of the part;
   compare the received inspection data to the MBD to determine any deviations of the cut part from the MBD;
   determine whether the cut part is defective based on the comparison;
   analyze at least one deviation of the cut part from the MBD to determine at least one root cause of the at least one deviation; and
   update a digital thread corresponding to the part when the cut part is determined to be defective including automatically determining and automatically taking an action to alleviate the at least one root cause, wherein automatically taking the action to alleviate the at least one root cause comprises at least one of revising a cutting script, revising a nesting script, revising the MBD, taking a cutting device out of service, or subjecting a cutting device to at least one of maintenance or repair.

17. The one or more computer storage media of claim 16, wherein updating the digital thread by the processor comprises at least one of instructing a cutting device to recut the cut part using new material or instructing the cutting device to revise the cut part.

18. The one or more computer storage media of claim 16, wherein updating the digital thread by the processor comprises communicating to a design entity at least one of information relating to the comparison of the inspection data to the MBD, the occurrence of defective parts over time, or information relating to past occurrences of defective parts.

19. The one or more computer storage media of claim 16, wherein updating the digital thread by the processor comprises automatically analyzing the occurrence of defective parts over time and automatically determining and automatically taking the action to reduce future occurrences of defective parts.

20. The one or more computer storage media of claim 16, wherein updating the digital thread by the processor comprises instructing a cutting device to revise the cut part in real time.

\* \* \* \* \*